(12) United States Patent
Thenmalaikaan Abdul Jabbar et al.

(10) Patent No.: US 11,842,057 B2
(45) Date of Patent: Dec. 12, 2023

(54) SEAMLESS CREATION OF RAID ARRAYS WITH OPTIMIZED BOOT TIME

(71) Applicant: DELL PRODUCTS L.P., Round Rock, TX (US)

(72) Inventors: Rahumath Ali Thenmalaikaan Abdul Jabbar, Madurai (IN); Krishnakumar Narasimhan, Chennai (IN)

(73) Assignee: DELL PRODUCTS L.P., Round Rock, TX (US)

(*) Notice: Subject to any disclaimer, the term of this patent is extended or adjusted under 35 U.S.C. 154(b) by 50 days.

(21) Appl. No.: 16/707,600

(22) Filed: Dec. 9, 2019

(65) Prior Publication Data

US 2021/0173575 A1    Jun. 10, 2021

(51) Int. Cl.
*G06F 3/06* (2006.01)
*G06F 13/40* (2006.01)

(52) U.S. Cl.
CPC .......... *G06F 3/0632* (2013.01); *G06F 3/0611* (2013.01); *G06F 3/0689* (2013.01); *G06F 13/4072* (2013.01)

(58) Field of Classification Search
CPC ...... G06F 3/0632; G06F 3/061; G06F 3/0689; G06F 3/0683; G06F 13/4072; G06F 11/1076; G06F 9/4411
See application file for complete search history.

(56) References Cited

U.S. PATENT DOCUMENTS

| | | |
|---|---|---|
| 8,909,767 B2 | 12/2014 | Sunkara et al. |
| 9,372,870 B1 | 6/2016 | Levy |
| 2003/0172145 A1 | 9/2003 | Nguyen |
| 2004/0158711 A1 | 8/2004 | Zimmer |
| 2004/0218093 A1 | 11/2004 | Radha et al. |
| 2010/0306773 A1 | 12/2010 | Lee et al. |
| 2014/0359302 A1* | 12/2014 | Joshi ............ G06F 21/72 713/189 |
| 2016/0019106 A1* | 1/2016 | Ali ............... G06F 9/4408 714/6.23 |
| 2018/0095679 A1* | 4/2018 | Wysocki ........... G06F 3/0689 |
| 2019/0138342 A1 | 5/2019 | Dornemann et al. |

FOREIGN PATENT DOCUMENTS

| | | |
|---|---|---|
| AU | 2005322350 | 7/2006 |
| EP | 1482404 | 12/2004 |
| WO | 01/82080 | 11/2001 |

OTHER PUBLICATIONS

Kubacki, Michael, UEFI Variable Runtime Cache, Nov. 27, 2019, Tianocore. (Year: 2019).*
Driver Writer's Guide for UEFI 2.3.1, Mar. 8, 2012, Intel Corporation, Version 1.01. (Year: 2012).*
Dell PowerEdge RAID Controller (PERC) S130 User's Guide (Year: 2016).*

* cited by examiner

*Primary Examiner* — Kalpit Parikh
(74) *Attorney, Agent, or Firm* — Jackson Walker LLP; Christopher J. Rourk

(57) ABSTRACT

A system for controlling processor operations is disclosed that includes a first function configured to be performed by one or more algorithms operating on a processor to identify one or more participating storage controllers, each having a software controller handle, and to cache the software controller handles during a query to a driver. A second function configured to be performed by one or more algorithms operating on the processor to invoke the driver with the cached software controller handles.

20 Claims, 2 Drawing Sheets

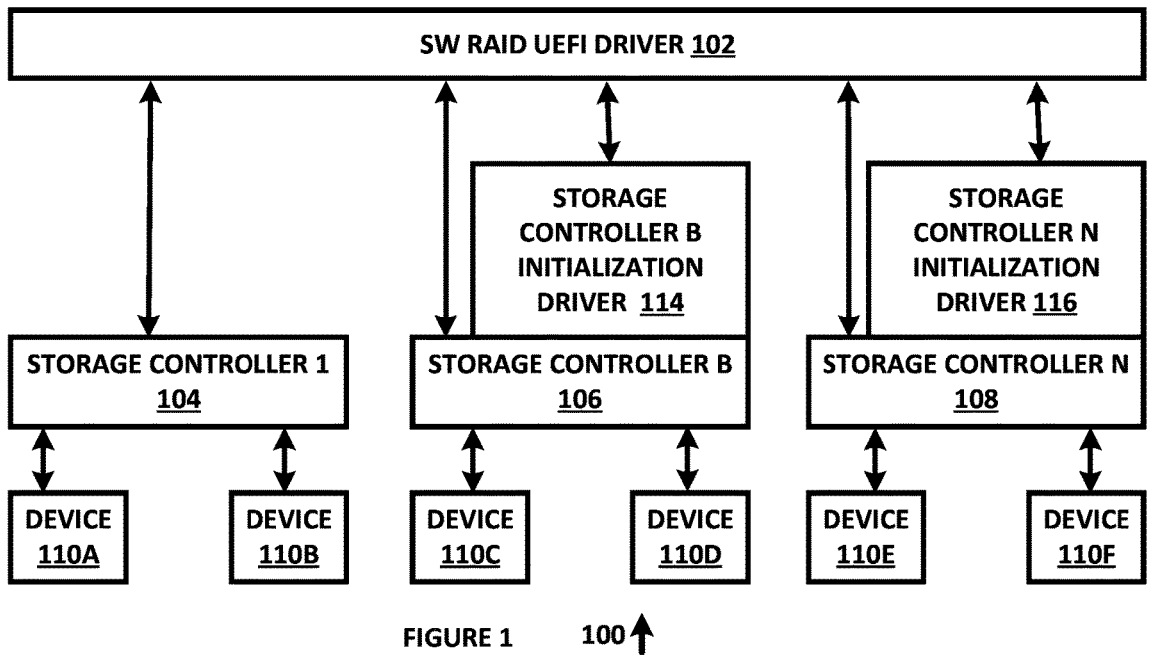
FIGURE 1    100
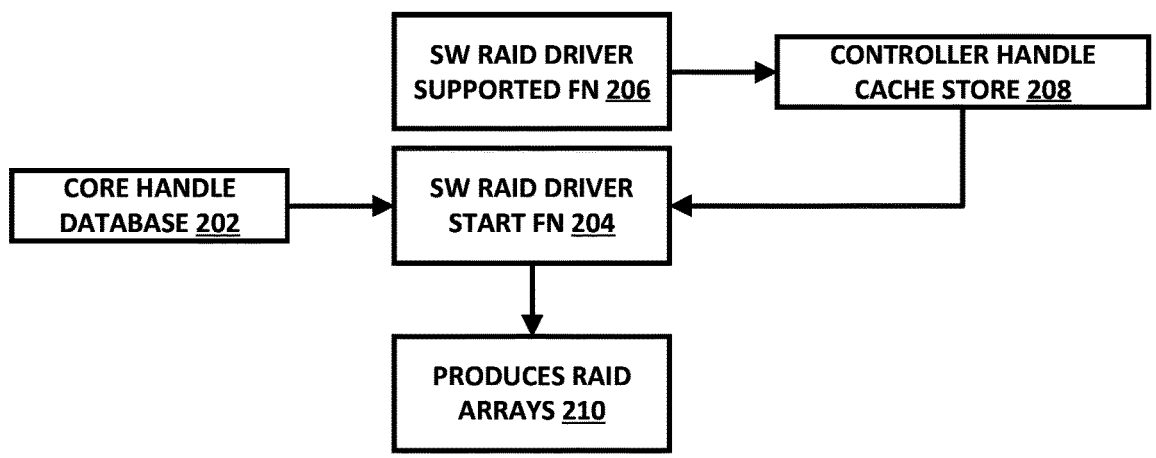
FIGURE 2    200

SEAMLESS CREATION OF RAID ARRAYS WITH OPTIMIZED BOOT TIME

TECHNICAL FIELD

The present disclosure relates generally to computer networks, and more specifically to a system and method for the seamless creation of a redundant array of independent disks with an optimized boot time.

BACKGROUND OF THE INVENTION

Boot time of a processor can be adversely affected by accessing network devices, such as data memory devices.

SUMMARY OF THE INVENTION

A system for controlling processor operations is disclosed that includes a first function that is configured to be performed by one or more algorithms operating on a processor, such as by compiling source code into object code and installing the object code into a processor, where the object code causes the processor to identify one or more participating storage controllers, each having a software controller handle, and to cache the software controller handles during a query to a driver. A second function is configured to be performed by one or more algorithms operating on the processor to invoke the driver with the cached software controller handles, which allows an arrays of multiple devices to be created in a single process.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a system 100 for providing seamless creation of redundant arrays of independent devices, in accordance with an example embodiment of the present disclosure;

FIG. 2 is a diagram of a system 200 for providing a software driver for redundant arrays of independent devices, in accordance with an example embodiment of the present disclosure.

DETAILED DESCRIPTION OF THE INVENTION

Figure 3:
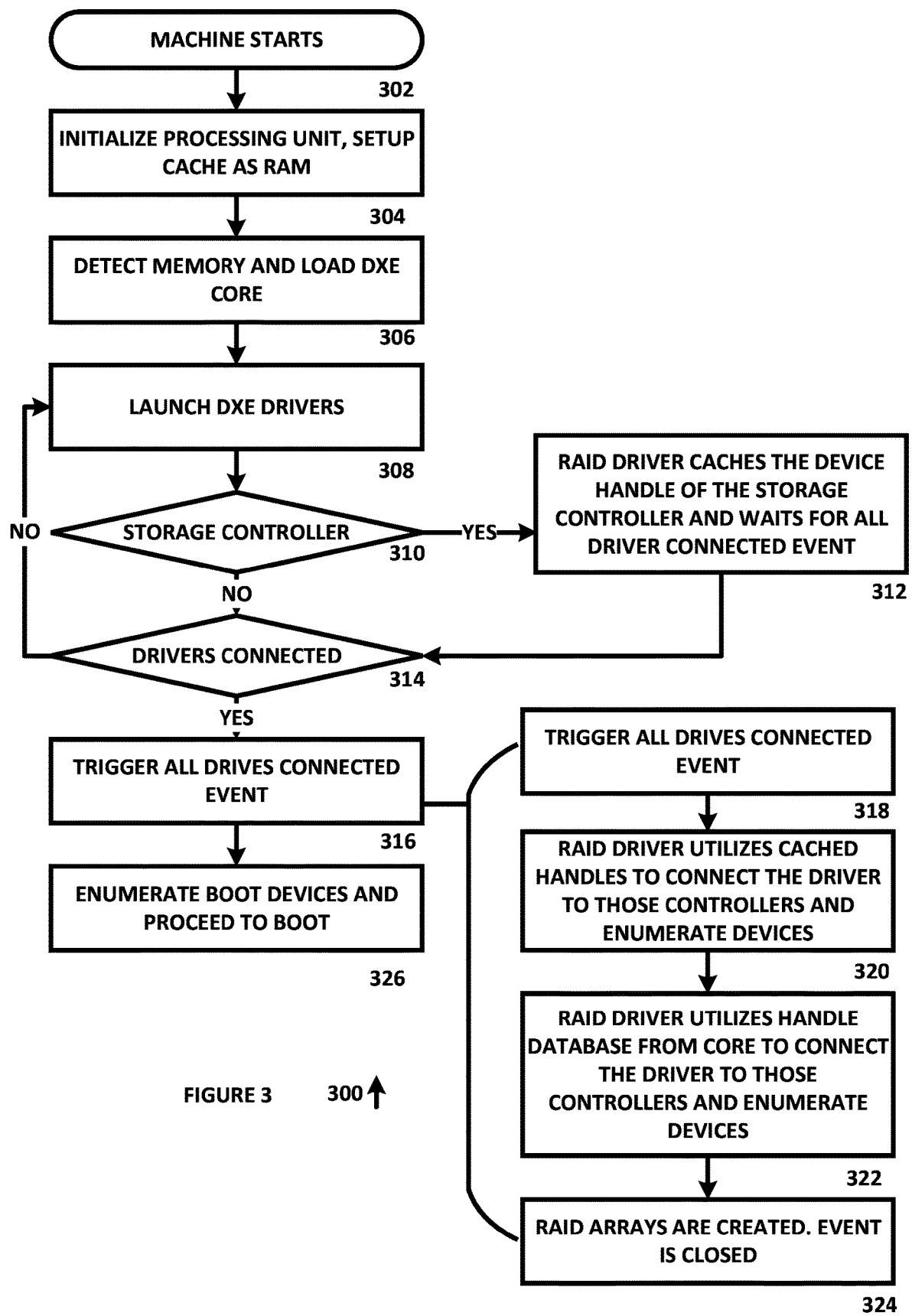
FIG. 3 is an algorithm 300 for providing seamless creation of redundant arrays of independent devices, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

A processor may be configured to support multiple boot modes, such as a boot mode for the Unified Extensible Firmware Interface (UEFI), a boot mode for a legacy operating system and other boot modes. These boot modes may have modes for a redundant array of independent devices (RAID), such as magnetic or solid state data memory devices, and non-RAID configurations for managing storage devices. In RAID mode, the storage devices can be handled or managed by a software RAID (SWRAID) UEFI and an option read-only memory (OPROM) driver. An SWRAID UEFI driver can be used to manage different types of storage controllers, such as a serial advanced technology attachment (SATA), a non-volatile memory express (NVMe) or other suitable storage controllers. In one embodiment, an SWRAID OPROM driver can be used to manage SATA controllers. A SATA controller driver can be assigned to ("owned by") an SWRAID UEFI driver, and a NVMe SWRAID UEFI driver can use a pass-through mode to manage NVMe controllers.

In one example embodiment, an SWRAID UEFI driver can attach its driver binding protocol on to a storage controller and enumerate the data storage devices associated with the storage controller. RAID arrays can then be created from the enumerated devices and managed by the SWRAID UEFI driver. However, in order to create and manage RAID arrays from different controllers (such as an NVMe controller), a SWRAID UEFI driver may need to depend on predetermined controller-specific protocols that need to be available on those controllers. The controller-specific protocols can be produced by the controller drivers (such as NVMe), which can be managed by the basic input-output system (BIOS).

In addition, the controller drivers can be launched by a UEFI kernel, where the order in which the drivers are launched can be selected based on the platform topology or in other suitable manners. The platform topology and the load order can require the SWRAID UEFI driver to perform a rescan of all the devices connected to the associated controllers, such as the SATA and NVMe controllers, which can adversely impact the boot time of the system, such as due to one or more of the following reasons or for other associated reasons:

1) In processors with more than one controller (such as SATA or NVMe), the number of rescans performed can be directly proportional to the number of controllers.
2) An SWRAID UEFI driver may depend on the availability of an NVMe pass-through protocol to create arrays from the NVMe controller. The NVMe pass-through protocol can be produced by the NVMe driver that is managed by BIOS. If the NVMe driver has executed prior to the SWRAID driver, then the NVMe pass-through protocol can be available, but when the NVMe driver has not executed then the NVMe pass-through protocol may not be available. In such circumstances, the creation of RAID arrays can be challenging.
3) Since the launch of drivers in UEFI environment may not have a specific order, the availability of the protocols, such as the NVMe pass-through protocol, at the time of SWRAID driver execution cannot be guaranteed. Therefore, RAID arrays may be lost and/or creation of the RAID arrays may fail.

The present disclosure is directed to caching of software controllers to handle the participating storage controllers during the initial query to the supported SWRAID UEFI driver. Upon completion of installation of predetermined device protocols, the start function of the SWRAID UEFI driver can be invoked with the cached handles to enumerate its devices. Furthermore, protocols from the other participating controller drivers can also be utilized, to enumerate their devices. In addition, RAID arrays can be created in single shot, which can reduces SWRAID UEFI driver execution time by approximately 50%.

The present disclosure provides a number of important technical features. One important technical feature is that a unique method is provided by which to create RAID arrays without multiple rescans. Another important technical feature is that a unique method is provided to ensure that all participating devices are part of the RAID array. Another important technical feature is a reduction in boot time by preventing multiple rescans and creating an array in a single shot. Another important technical feature is caching handles for efficient connect sequence. The present disclosure thus provides for boot time reduction, an efficient method for managing the participating storage devices and numerous other features.

To attach the SWRAID UEFI driver with its controller handle and then to the controller, the SWRAID driver's supported function can be invoked. The supported function identifies the participating storage class controllers and caches the software controller handles in an internal store. The SWRAID driver's start function (which creates and manages the RAID arrays) can be kept pending from immediate execution. The delay of the start function execution can be selected to support the devices from different controllers that are used to create the RAID arrays. To facilitate seamless RAID array creation, a callback function can be registered for use in executing the start function. Controller drivers (such as for NVMe) can be connected to an associated controller, to produce protocols to access the devices attached to the controller. Once the connection of all the drivers is completed, the BIOS can install a protocol to signal the completion. Upon receipt of this signal, the SWRAID driver's start function can be invoked through the callback function which was already registered. The software controller handle for the SWRAID driver start function can be obtained from the cached handle database. The devices attached to that specific controller handle can then be enumerated in one shot. Finally, the virtual RAID array can be created from the pool of physical devices.

Although example embodiments of the system and algorithmic processes have been described above and as follows, a person of skill in the art will recognize from these examples that general principles associated with these example embodiments can be applied to other suitable systems and methods, as reflected by the claims.

FIG. 1 is a diagram of a system 100 for providing seamless creation of redundant arrays of independent devices, in accordance with an example embodiment of the present disclosure. System 100 includes SW RAID UEFI driver 102, storage controller 1 104, storage controller B 106, storage controller N 108, storage controller B initialization driver 112, storage controller N initialization driver 114 and devices 110A through 110F, each of which can be implemented in hardware or a suitable combination of hardware and software.

SW RAID UEFI driver 102 can include one or more processors configured to implement one or more algorithms that provide a driver for a software redundant array of independent devices that is used by a unified extensible firmware interface, such as discussed above. In one example embodiment, SW RAID UEFI driver 102 can utilize cached handles of storage controllers when its start function is invoked. In addition, protocols from other participating controller drivers can be utilized to enumerate their devices, and redundant arrays of independent devices can be created in a single shot, which can reduce the execution of SW RAID UEFI driver 102 relative to drivers that lack the disclosed functionality.

Storage controller 1 104 can include one or more processors configured to implement one or more algorithms that provide a controller for a plurality of drives, such as device 110A and device 110B, such as discussed above. Storage controller 1 104 can have software controller handles that reference blocks of memory, objects or other suitable software constructs.

Storage controller B 106 can include one or more processors configured to implement one or more algorithms that provide a controller for a plurality of drives, such as device 110C and device 110D, such as discussed above. Storage controller B 106 can have software controller handles that reference blocks of memory, objects or other suitable software constructs.

Storage controller N 108 can include one or more processors configured to implement one or more algorithms that provide a controller for a plurality of drives, such as device 110E and device 110F, such as discussed above. Storage controller N 108 can have software controller handles that reference blocks of memory, objects or other suitable software constructs.

Storage controller B initialization driver 112 can include one or more processors configured to implement one or more algorithms that provide protocols to access the devices associated with storage controller B 104, such as device 110C and device 110D or other suitable devices. In one example embodiment, the protocols can include an NVMe protocol, a SATA protocol, an NVMe pass through protocol or other suitable protocols.

Storage controller N initialization driver 114 can include one or more processors configured to implement one or more algorithms that provide protocols to access the devices associated with storage controller N 108, such as device 110E and device 110F or other suitable devices. In one example embodiment, the protocols can include an NVMe protocol, a SATA protocol, an NVMe pass through protocol or other suitable protocols.

Devices 110A through 110F can include one or more circuits configured to implement one or more algorithms that provide access to data storage or other suitable functions. While devices 110A through 110F are generally described herein as storage devices, other suitable devices can also or alternatively be used.

In operation, system 100 provides for the seamless creation of redundant arrays of independent devices or other suitable devices. System 100 can use an optimized boot configuration to decrease the boot time required to configure the disks or devices, and to avoid misconfiguration or other errors.

FIG. 2 is a diagram of a system 200 for providing a software driver for redundant arrays of independent devices, in accordance with an example embodiment of the present disclosure. System 200 includes core handle database 202, SW RAID driver start function 204, SW RAID driver supported function 206, controller handle cache store 208 and RAID arrays 210, each of which can be implemented in hardware or a suitable combination of hardware and software.

Core handle database 202 can include one or more data memory devices that are configured to store reference blocks of memory, objects or other suitable software constructs that provide suitable handles, such as a software controller handle for the SW RAID driver start function and other controller handles.

SW RAID driver start function 204 can include one or more processors configured to implement one or more algorithms that provide functions that are performed upon startup of a processor. In one example embodiment, SW RAID driver start function 204 can create and manage RAID arrays, and can be kept pending or delayed from immediate execution, to support the devices from different controllers that are required to create the RAID arrays. To facilitate seamless RAID array creation, a callback function can be registered to execute SW RAID driver start function 204. Controller drivers (e.g. NVMe) are connected to its controller respectively to produce protocols to access the devices attached to the controller. Once the connection of all the drivers is completed, the BIOS can install a protocol to signal the completion. On receipt of this signal, SW RAID driver start function 204 can be invoked through the registered callback function. The software controller handle for SW RAID driver start function 204 can be obtained from core handle database 202 or other suitable locations.

SW RAID driver supported function 206 can include one or more processors configured to implement one or more algorithms that are invoked in order to attach the SWRAID UEFI driver with its controller handle and then to the controller. SW RAID driver supported function 206 can identify the participating storage class controllers and caches the software controller handles in controller handle cache store 208 or other suitable locations.

Controller handle cache store 208 can include one or more data memory devices that are configured to store reference blocks of memory, objects or other suitable software constructs that provide suitable software controller handles, such as a software controller handle for the storage class controllers and other controller handles.

RAID arrays 210 can include a plurality of hardware devices and associated algorithmic controls for each device that are used by a plurality of processors to store data. In one example embodiment, each of the processors can be associated with one of the RAID arrays upon startup, or in other suitable manners.

In operation, system 200 is used to provide a software driver for redundant arrays of independent devices. System 200 can be used to reduce the execution time for an associated driver, such as by creating arrays of devices in a single shot or in other suitable manners.

FIG. 3 is an algorithm 300 for providing seamless creation of redundant arrays of independent devices, in accordance with an example embodiment of the present disclosure. Algorithm 300 can be implemented in hardware or a suitable combination of hardware and software.

Algorithm 300 begins at 302, where data processing machinery is started. In one example embodiment, the data processing machinery can include one or more processors and associated peripheral devices, and can start in response to a user control, can be automatically started in response to a management function for a plurality of servers, or can be started in other suitable manners. The algorithm then proceeds to 304.

At 304, a processing unit of the data processing machinery is initialized, and a data memory device is selected as a cache and is configured for use as RAM by the processing unit. The algorithm then proceeds to 306.

At 306, the RAM memory is detected and a driver execution environment (DXE) core is loaded by the processor under algorithmic control. In one example embodiment, the DXE core can be used to produce a set of boot services, DXE services, runtime services and other suitable services. These services can have one or more associated drivers and other associated algorithmic components. The algorithm then proceeds to 308.

At 308, DXE drivers are launched by the processor under algorithmic control. In one example embodiment the DXE drivers can be launched in a UEFI environment as discussed further herein, in a predetermined order or in other suitable manners. The algorithm then proceeds to 310.

At 310, it is determined by the processor under algorithmic control whether a storage controller is present. In one example embodiment, the storage controller can be a SATA storage controller, an NVMe storage controller or other suitable storage controllers. If it is determined that a storage controller is not present, then the algorithm proceeds to 314. If it is determined that a storage controller is present, the algorithm proceeds to 312 where a RAID driver caches the device handle of the storage controller and waits for an all drivers connected event. In one example embodiment, the all drivers connected event can be indicated after successful completion of the performance of the algorithmic process at 314 to determine whether all drivers are connected, or in other suitable manners. The algorithm then proceeds to 314.

At 314, it is determined whether drivers are connected by the processor under algorithmic control. In one example embodiment, the processor can run a status checking algorithm for each driver or otherwise determine whether the drivers are connected. If it is determined that drivers are not connected, the algorithm returns to 308, otherwise the algorithm proceeds to 316.

At 316, an all drives connected event is triggered by the processor under algorithmic control. In one example embodiment, the all drives connected event can be triggered by a sequence of algorithmic processes, such as a first process in which a RAID driver utilizes cached handles to connect the driver to those controllers and to enumerate devices at 320. The algorithm can then proceed to 322 where a RAID driver utilizes a handle database from the core to connect the driver to those controllers and enumerate devices. The algorithm can then proceed to 324 where RAID arrays are created and the event is closed. The algorithm then proceeds to 326.

At 326, boot devices are enumerated and the algorithmic process implemented by the processor proceeds to the booting of the processor.

In operation, algorithm 300 provides for the seamless creation of redundant arrays of independent devices, by allowing the controllers for those devices to be identified and caching the handles associated with the controllers and devices. Although algorithm 300 is shown as a flow chart, it can also or alternatively be implemented as an object-oriented diagram, a state diagram, a ladder diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for controlling processor operations, comprising:
   a redundant array of independent devices (RAID) system comprising one or more algorithms stored in a non-transient storage medium and configured to operate on a processor, wherein the algorithms provide, when executed:
   a first function to identify two or more participating storage controllers for inclusion in the RAID system, each having a software controller handle, to cache the software controller handles in a separate handle database associated with the RAID system during an initial query to a RAID system driver and to delay a start of the RAID system driver; and
   a second function to select one of the two or more cached storage controller handles and to invoke the start of the RAID system driver prior to the selected cached software controller handle wherein the selected cached storage controller handle is a SWRAID UEFI driver that is delayed from execution until a callback function is executed.

2. The system of claim 1 wherein the second function is configured to be performed upon completion of connection of all drivers.

3. The system of claim 1 further comprising a third function to enumerate one or more devices associated with the selected cached storage controller handle while the selected cached storage controller handle is delayed from execution.

4. The system of claim 1 further comprising a third function to enumerate one or more devices associated with a cached storage controller handle for a nonvolatile memory express.

5. The system of claim 1 further comprising a third function to configure a redundant array of independent devices in single process step.

6. The system of claim 1 wherein the software controller handle is configured to connect the driver to the storage controller.

7. The system of claim 6 wherein the second function is configured to be performed upon completion of connection of all drivers.

8. The system of claim 6 further comprising a third function-to enumerate one or more devices associated with the selected cached storage controller handle while the selected cached storage controller handle is delayed from execution.

9. The system of claim 6 further comprising a third function to enumerate one or more devices associated with a cached storage controller handle for a nonvolatile memory express.

10. The system of claim 6 further comprising a third function to configure a redundant array of independent devices in single process step.

11. A method for controlling processor operations, comprising:
identifying two or more participating storage controllers using a first function of a software redundant array of independent devices (RAID) system implemented as one or more algorithms configured to be performed by a processor, wherein each storage controller has a software controller handle;
caching the software controller handles in a separate handle database during an initial query to a software RAID system driver using one or more algorithms operating on the processor;
invoking a start of the software RAID system driver after the caching and prior to selecting one of the cached software controller handles using a second function of the software RAID system implemented as one or more algorithms configured to be performed by the processor; and
enumerating one or more devices associated with the driver using a third function prior to invoking a callback function that invokes the start of the software RAID system driver.

12. The method of claim 11 wherein the second function is configured to delay the start of the software RAID system driver and to be performed upon completion of installation of predetermined device protocols using a callback function.

13. The method of claim 11 wherein the selected cached storage controller handle is a SWRAID UEFI driver.

14. The method of claim 11 further comprising enumerating one or more devices associated with a second driver using a third function prior to invoking a callback function of the driver.

15. The method of claim 11 further comprising creating a redundant array of independent devices in a single process step using a third function.

16. The method of claim 11 wherein the second function is configured to delay the start of the software RAID system driver and to be performed upon completion of installation of predetermined device protocols using a callback function and wherein the selected cached storage controller handle is a SWRAID UEFI driver.

17. The method of claim 11 further comprising enumerating one or more devices associated with a second driver using a third function prior to invoking a callback function of the driver and further comprising creating a redundant array of independent devices in a single process step using a third function.

18. The method of claim 11 wherein the selected cached storage controller handle is a SWRAID UEFI driver and further comprising enumerating one or more devices associated with a second driver using a third function prior to invoking a callback function of the driver.

19. The method of claim 11 wherein the second function is configured to delay the start of the software RAID system driver and to be performed upon completion of installation of predetermined device protocols using a callback function, wherein the selected cached storage controller handle is a SWRAID UEFI driver and further comprising enumerating one or more devices associated with a second driver using a third function prior to invoking a callback function of the driver.

20. The method of claim 11 wherein the selected cached storage controller handle is a SWRAID UEFI driver, and further comprising enumerating one or more devices associated with a second driver using a third function prior to invoking a callback function of the driver and creating a redundant array of independent devices in a single process step using a third function.

* * * * *